United States Patent
Kocev

(10) Patent No.: US 7,831,800 B2
(45) Date of Patent: Nov. 9, 2010

(54) TECHNIQUE FOR PREFETCHING DATA BASED ON A STRIDE PATTERN

(75) Inventor: Andrej Kocev, York, ME (US)

(73) Assignee: Globalfoundries Inc.

( * ) Notice: Subject to any disclaimer, the term of this patent is extended or adjusted under 35 U.S.C. 154(b) by 460 days.

(21) Appl. No.: 11/750,266

(22) Filed: May 17, 2007

(65) Prior Publication Data

US 2008/0288751 A1  Nov. 20, 2008

(51) Int. Cl.
*G06F 12/00* (2006.01)

(52) U.S. Cl. .................. 711/213; 711/220; 711/217; 711/E12.057

(58) Field of Classification Search .................. 711/137
See application file for complete search history.

(56) References Cited

U.S. PATENT DOCUMENTS

| 5,375,216 A | 12/1994 | Moyer et al. |
| 5,940,876 A * | 8/1999 | Pickett ........................ 711/220 |
| 6,202,130 B1 | 3/2001 | Scales, III et al. |
| 6,412,046 B1 * | 6/2002 | Sharma et al. .............. 711/137 |
| 6,571,318 B1 * | 5/2003 | Sander et al. ............... 711/137 |
| 2003/0126591 A1 * | 7/2003 | Wu et al. ..................... 717/158 |
| 2007/0005934 A1 * | 1/2007 | Rotithor et al. ............. 711/213 |

* cited by examiner

*Primary Examiner*—Matt Kim
*Assistant Examiner*—Hamdy S Ahmed

(57) ABSTRACT

A processor system (100) includes a central processing unit (102) and a prefetch engine (110). The prefetch engine (110) is coupled to the central processing unit (102). The prefetch engine (110) is configured to detect, when data associated with the central processing unit (102) is read from a memory (114), a stride pattern in an address stream based upon whether sums of a current stride and a previous stride are equal for a number of consecutive reads. The prefetch engine (110) is also configured to prefetch, for the central processing unit (102), data from the memory (114) based on the detected stride pattern.

20 Claims, 3 Drawing Sheets

TECHNIQUE FOR PREFETCHING DATA BASED ON A STRIDE PATTERN

BACKGROUND

1. Field of the Disclosure

The present disclosure is generally directed to prefetching data and, more particularly, to prefetching data from a memory based on a stride pattern.

2. Description of the Related Art

Prefetch engines have been employed within processor systems to detect patterns in addresses associated with reads of main memory. The detected patterns have been utilized by the prefetch engines to predict future addresses in the main memory from which data will be read. The data from the predicted future addresses of the main memory has then been prefetched from the main memory to a cache memory (cache) prior to an actual request for the data. When the data is requested, the prefetched data may be consumed by an associated operation executing on a central processing unit (CPU) or may be consumed by an input/output (I/O) device, without the delay usually associated with reading the data from the main memory. In a typical processor system, multiple prefetch engines may be employed to independently track respective independent address streams.

Traditionally, many processor systems have employed a shared structure (to reduce the amount of resources required for storing stride patterns) that has maintained a linked list of strides for multiple prefetch engines. For example, for the stride pattern +1, +2, +1, +2, . . . , a first prefetch engine may build the following linked list: +1−>+2; and +2−>+1. In this case, a +2 stride follows a +1 stride and a +1 stride follows a +2 stride. Unfortunately, when multiple prefetch engines are utilizing the same shared structure to store stride patterns, each of the prefetch engines may attempt to modify the linked list to match the stride pattern of an associated address stream. For example, for the stride pattern +1, +3, +1, +3, . . . , a second prefetch engine may build the following linked list: +1−>+3; and +3−>+1. In this case, a +3 stride follows a +1 stride and a +1 stride follows a +3 stride. In this example, the strides conflict between the first and second prefetch engines and, as such, the prefetch engines may prefetch data from an incorrect address.

What is needed is an improved technique for prefetching data from a memory based on a detected stride pattern.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
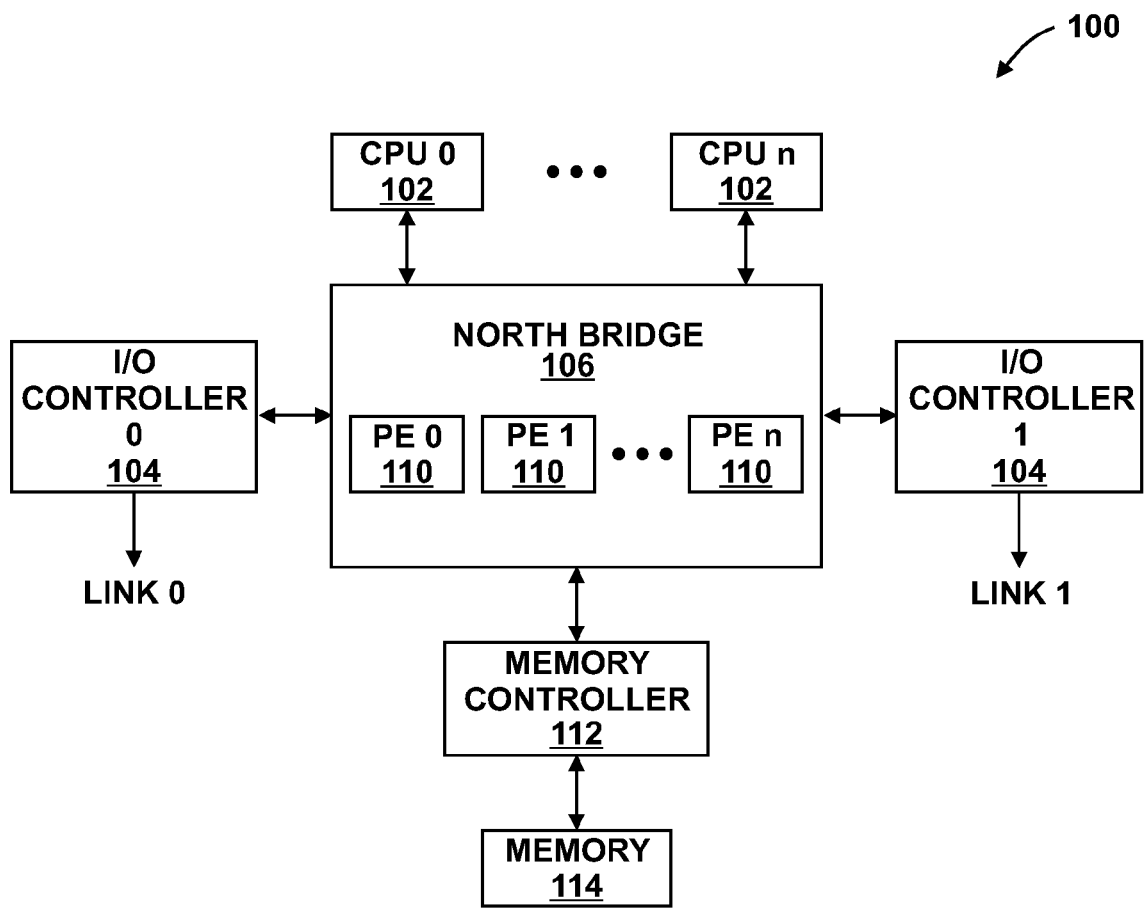
FIG. 1 is an example electrical block diagram of a processor system that is configured according to various embodiments of the present disclosure.

According to one aspect of the present disclosure, a technique is disclosed that detects (when reading data from a memory associated with a device) a stride pattern in an address stream. The stride pattern is detected based upon whether sums of a current stride and a previous stride are equal for a number of consecutive reads during a learning mode. Data is then prefetched (in a prefetch mode) for the device, from the memory, based on the detected stride pattern. The device may be, for example, a central processing unit (CPU), an input/output (I/O) device, or another device that reads memory. As used herein, the term "coupled" includes both a direct electrical connection between elements (or blocks) and an indirect electrical connection between elements (or blocks) provided by one or more intervening elements (or blocks). In this disclosure, the term "stride" means a change in an address between consecutive reads. For example, if a current read address is '100' and a next read address is '101' then the stride is '+1'. As another example, if a current read address is '105' and a next read address is '101' then the stride is '−4'.

According to another aspect of the present disclosure, a confidence counter, which is incremented when the sums of the current stride and the previous stride are equal for two consecutive reads, may be implemented within a prefetch engine (or other location). In a typical implementation, a current address (of a tracked thread) in a memory is determined. Then, when the confidence counter exceeds a threshold value, data for the tracked thread is prefetched from the memory (e.g., to an internal cache of a CPU) at a next address in the memory. In this case, the next address corresponds to a sum of the current address of the tracked thread and a next stride or a sum-of-strides included in the detected stride pattern. An inactive prefetch engine (PE), within a memory prefetch table (MPT), may be allocated to an address stream when a new address of an incoming read to memory does not match an address of an active PE. If an inactive PE is not available, an active PE may be chosen to track the new address. As used herein, in order for a read from memory to "match" one or more tracked threads a new address associated with the read is required to be within some predetermined +/− range of an address stored in a PE.

When the new address associated with the read from the memory does not match the one or more tracked threads and there is no room in the MPT, a least recently used (LRU) active PE, may be reassigned to track the new address. Alternatively, which PE to reassign may be based on other criteria. According to another aspect of the present disclosure, a respective PE in the MPT may be invalidated (i.e., made inactive) when a data prefetch crosses a page boundary, e.g., a 4 k page boundary. The device may, for example, correspond to one or more CPUs, one or more I/O devices, or both CPUs and I/O devices. The stride pattern may be, for example, an alternating stride pattern (e.g., +1, +3, +1, +3, . . . ) or an equal stride pattern (e.g., +3, +3, +3, +3, . . . ).

Figure 2:
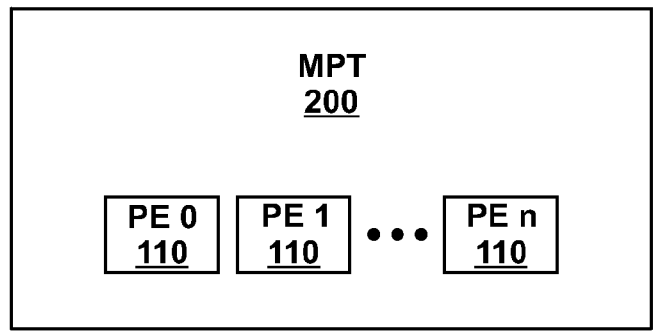
FIG. 2 is an example electrical block diagram of a memory prefetch table, configured according to one or more embodiments of the present disclosure, that includes multiple prefetch engines.

With reference to FIG. 1, an example processor system 100 is illustrated that includes multiple central processing units (CPUs) 102, multiple input/output (I/O) controllers 104, a Northbridge 106, a memory controller 112, and a memory 114. While only two CPUs 102 are depicted in FIG. 1, it should be appreciated that the techniques disclosed herein are broadly applicable to processor systems that include more or less that two CPUs, each of which have one or more levels of internal cache. The memory controller 112 may be, for example, a dynamic random access memory (DRAM) controller and, in this case, the memory 114 includes multiple DRAM modules. In at least one embodiment, the memory controller 112 is integrated within the Northbridge 106. The I/O controllers 104 may be, for example, HyperTransport™ controllers. As is illustrated, the system 100 includes multiple prefetch engines (PEs) 110, e.g., one for each device that reads data from the memory 114. With reference to FIG. 2, a memory prefetch table (MPT) 200 is illustrated that includes multiple of the PEs 110, which each maintain information for tracking strides for a different address stream. The MPT 200 may include, for example, eight PEs each of which include a current address field, a previous stride field, a current stride field, and a confidence counter field for a respective tracked address stream.

Figure 3:
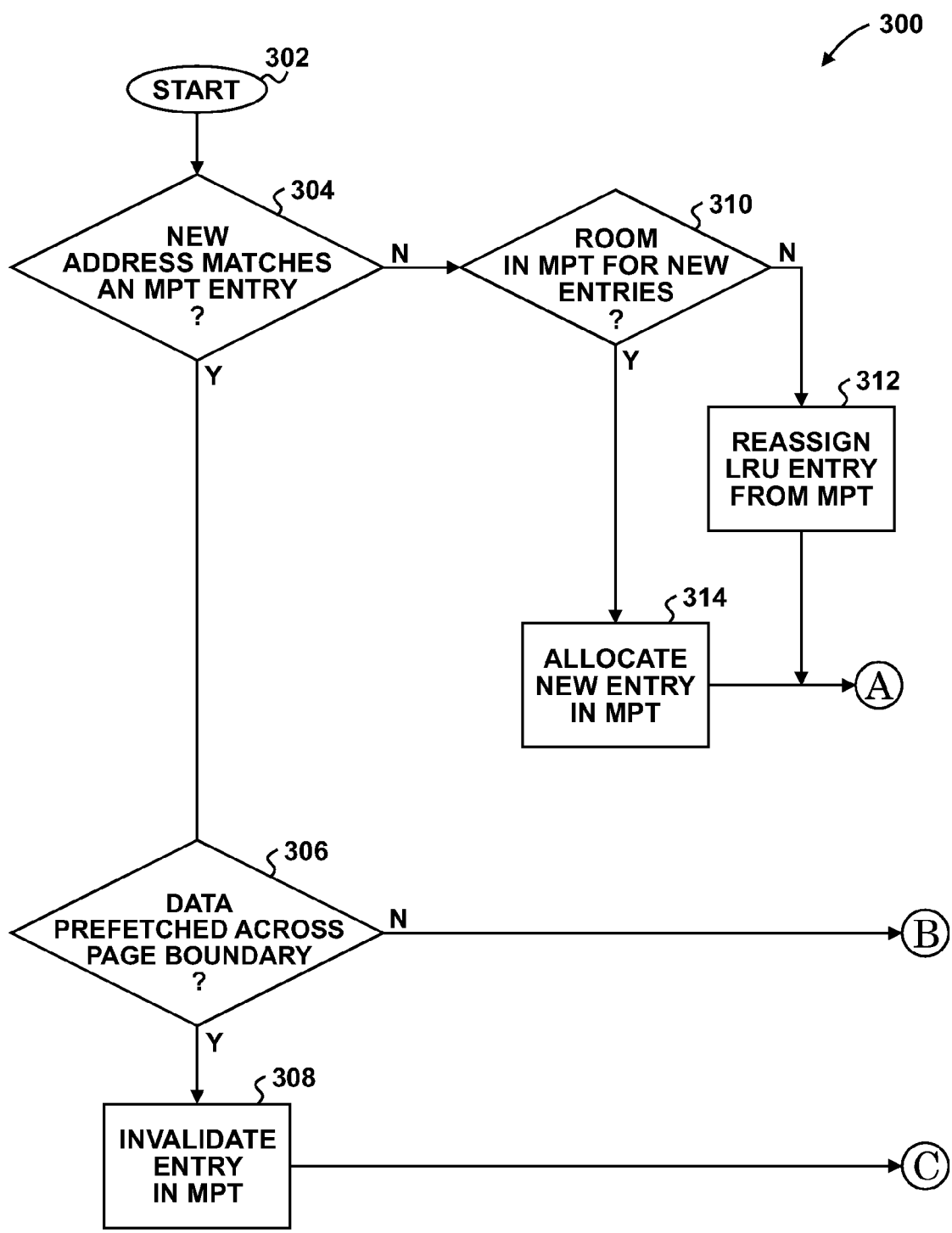
FIGS. 3-4 show an example flow chart of a process for detecting a stride pattern in an address stream according to various embodiments of the present disclosure.
Figure 4:
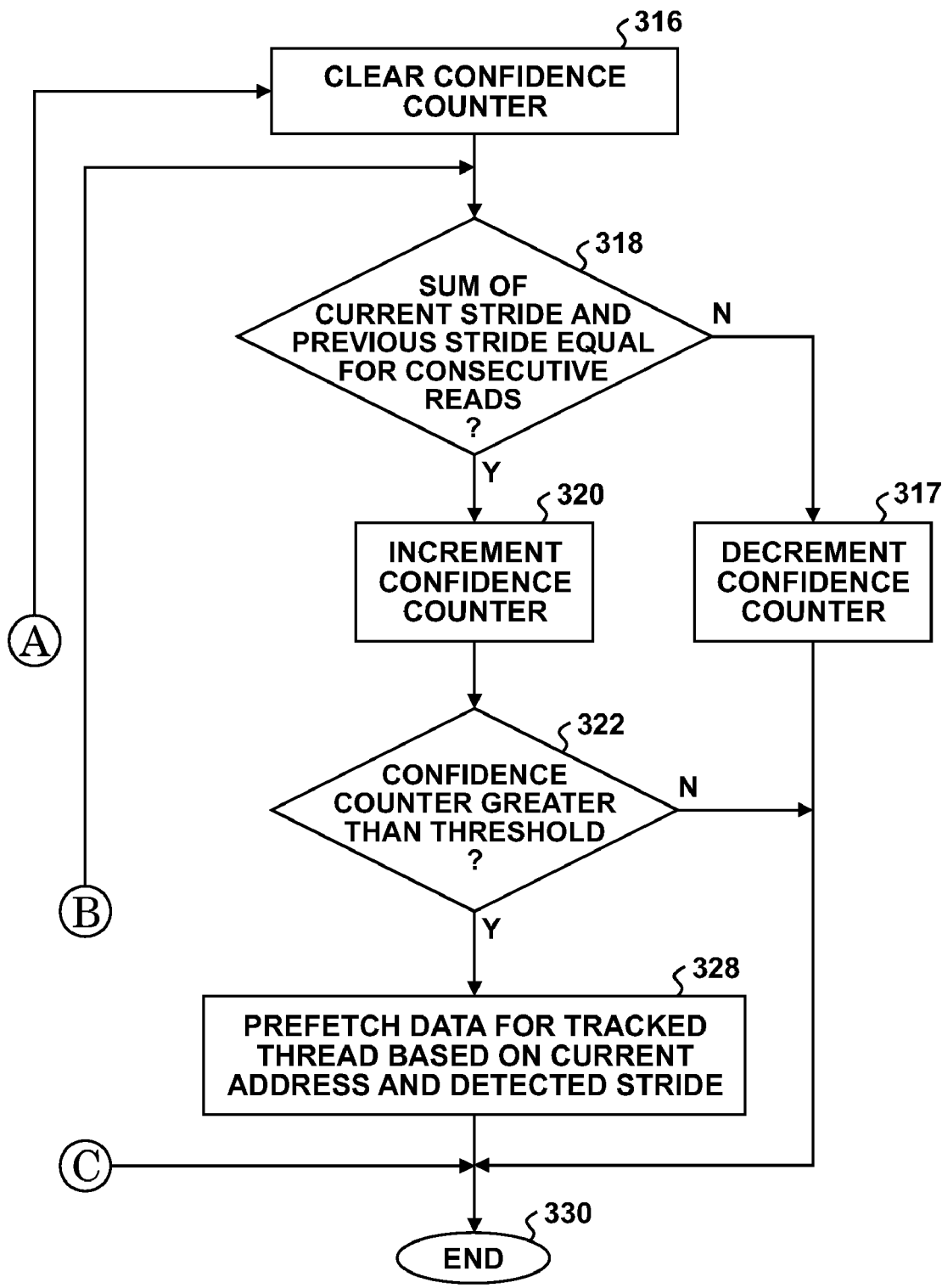

With reference to FIGS. 3 and 4, a process 300 for detecting a stride pattern in an address stream, according to various embodiments of the present disclosure, is illustrated. In block 302, the process 300 is initiated when a read to memory occurs, at which point control transfers to decision block 304. In block 304, when a new address associated with the read does not match an assigned PE 110 (entry) in the MPT 200, control transfers to decision block 310. In block 310, logic determines whether there is room in the MPT 200 for a new entry, i.e., whether an inactive PE is available. For example, each of the PEs 110 may include a status bit that indicates whether the PEs 110 are active or inactive. In this embodiment, logic (which may be included within the prefetch block) determines if an inactive one of the PEs 110 needs to be allocated when the logic detects a new address, or if the new address matches an active one of the PEs 110. The logic may, for example, examine the status bit of each of the PEs 110 to determine if one of the PEs is available.

If there is no room for a new entry in the MPT 200 (i.e., no PEs are inactive) in block 310, control transfers to block 312, where a least recently used (LRU) one of the entries (the active PEs 110) is reassigned. Next, control transfers to block 316, where a confidence counter for the reassigned entry is cleared. If there is room for a new entry in the MPT 200 in block 310, control transfers to block 314, where a new entry is allocated in the MPT 200. Next, in block 316, a confidence counter for the new entry is cleared. From block 316, control transfers to decision block 318. In block 304, when an entry (active PE) associated with the thread is already present (i.e., a new address matches an address of a PE) in the MPT 200, control transfers to decision block 306. It should be appreciated that in this embodiment each tracked thread is assigned a respective prefetch engine, i.e., each tracked thread has its own entry in the MPT 200.

In block 306, the PE 110 determines whether data will be prefetched across a page boundary of the memory 114. If data will be prefetched across a page boundary in block 306, control transfers to block 308, where an associated entry in the MPT 200 is invalidated (i.e., the PE 110 enters an inactive state). Next, control transfers from block 308 to block 330. If data will not be prefetched across a page boundary in block 306, control transfers to block 318. It should be appreciated that a specific implementation may not require checking whether data will be fetched across a page boundary. In block 318, the PE 110 determines whether a sum of a current stride and a previous stride are equal for consecutive reads. If the sum of the current stride and the previous stride are not equal for consecutive reads, control transfers from block 318 to block 317, where the confidence counter is decremented. From block 317 control then transfers to block 330. If the sum of the current stride and the previous stride are equal for consecutive reads, control transfers from block 318 to block 320, where an associated confidence counter is incremented. It should be appreciated that alternating stride patterns (e.g., +1, +2, +1, +2, ...) and equal stride patterns (e.g., +4, +4, +4, +4, ...) can readily be tracked according to the techniques disclosed herein.

Next, in decision block 322, the PE 110 determines whether the confidence counter is greater than a threshold (e.g., ten). If the confidence counter is not greater than the threshold in block 322, control transfers to block 330. If the confidence counter is greater than the threshold in block 322, control transfers to block 328, where the PE 110 prefetches data for the tracked thread, based on the current address and the detected stride. For example, the PE 110 may prefetch, for the tracked thread, data from the memory at a next address in the memory that corresponds to a sum of a current address of the tracked thread and a next stride or a sum-of-strides included in the detected stride pattern. Following block 328, control transfers to block 330, where the process 300 terminates.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
    detecting, when reading data from a memory associated with a device, a stride pattern in an address stream in response to determining a sum of a current stride and a previous stride associated with a first read is equal to a sum of a current stride and a previous stride associated with a second read, where the first read and the second read are consecutive reads; and
    prefetching, for the device, data from the memory based on the stride pattern.

2. The method of claim 1, further comprising:
    incrementing a confidence counter in response to detecting the stride pattern.

3. The method of claim 2, wherein the prefetching further comprises:
    prefetching, for a tracked thread, data from the memory at a next address in the memory when the confidence counter exceeds a threshold value, wherein the next address corresponds to a sum of a current address of the tracked thread and a next stride or a sum-of-strides included in the stride pattern.

4. The method of claim 1, further comprising:
    allocating a new entry in a memory prefetch table when a read from the memory does not match one or more tracked threads, wherein the new entry corresponds to a respective prefetch engine.

5. The method of claim 4, wherein the allocating further comprises:
    determining whether there is room in the memory prefetch table for an additional entry when the read from the memory does not match the one or more tracked threads; and reassigning a least recently used entry in the memory prefetch table when the read from the memory does not match the one or more tracked threads and there is no room in the memory prefetch table.

6. The method of claim 4, wherein allocating further comprises:
determining whether a data prefetch crosses a page boundary; and
invalidating a respective entry in the memory prefetch table when the data prefetch crosses the page boundary.

7. The method of claim 1, wherein the device is a central processing unit or an input/output device.

8. The method of claim 1, wherein the stride pattern is an alternating stride pattern.

9. A memory subsystem, comprising:
a memory; and
a prefetch engine coupled to the memory, wherein the prefetch engine is configured to:
detect, when data associated with a device is read from the memory, a stride pattern in an address stream in response to determining a sum of a current stride and a previous stride associated with a first read is equal to a sum of a current stride and a previous stride associated with a second read, where the first read and the second read are consecutive reads; and
prefetch, for the device, data from the memory based on the stride pattern.

10. The memory subsystem of claim 9, wherein the prefetch engine is further configured to:
increment a confidence counter in response to detecting the stride pattern.

11. The memory subsystem of claim 10, wherein the prefetch engine is further configured to:
prefetch data for a tracked thread from the memory at a next address in the memory when the confidence counter exceeds a threshold value, wherein the next address corresponds to a sum of a current address of the tracked thread and a next stride or a sum-of-strides included in the stride pattern.

12. The memory subsystem of claim 9, further comprising:
logic configured to allocate a new entry in a memory prefetch table when a read from the memory does not match one or more tracked threads.

13. The memory subsystem of claim 12, wherein the logic is further configured to:
determine whether there is room in the memory prefetch table for an additional entry when the read from the memory does not match the one or more tracked threads; and
reassign a least recently used entry in the memory prefetch table when the read from the memory does not match the one or more tracked threads and there is no room in the memory prefetch table.

14. The memory subsystem of claim 12, wherein the logic is further configured to:
determine whether a data prefetch crosses a page boundary; and
invalidate a respective entry in the memory prefetch table when the data prefetch crosses the page boundary.

15. The memory subsystem of claim 9, wherein the device is a central processing unit or an input/output device.

16. The memory subsystem of claim 9, wherein the stride pattern is an alternating stride pattern.

17. A processor system, comprising:
a central processing unit; and
a prefetch engine coupled to the central processing unit, wherein the prefetch engine is configured to:
detect, when data associated with the central processing unit is read from a memory, a stride pattern in an address stream in response to determining a sum of a current stride and a previous stride associated with a first read is equal to a sum of a current stride and a previous stride associated with a second read, where the first read and the second read are consecutive reads; and
prefetch, for the central processing unit, data from the memory based on the stride pattern.

18. The processor system of claim 17, wherein the prefetch engine is further configured to:
increment a confidence counter in response to detecting the stride pattern.

19. The processor system of claim 18, wherein the prefetch engine is further configured to:
prefetch, for a tracked thread, data from the memory at a next address in the memory when the confidence counter exceeds a threshold value, wherein the next address corresponds to a sum of a current address of the tracked thread and a next stride or a sum-of-strides included in the stride pattern.

20. The processor system of claim 19, wherein the stride pattern is an alternating stride pattern.

* * * * *